United States Patent
Kawai

(10) Patent No.: US 12,049,428 B2
(45) Date of Patent: Jul. 30, 2024

(54) BAKING SLURRY COMPOSITION, GREEN SHEET, METHOD FOR MANUFACTURING GREEN SHEET, METHOD FOR MANUFACTURING SINTERED PRODUCT, AND METHOD FOR MANUFACTURING MONOLITHIC CERAMIC CAPACITOR

(71) Applicant: GOO CHEMICAL CO., LTD., Kyoto (JP)

(72) Inventor: Yutaka Kawai, Kyoto (JP)

(73) Assignee: GOO CHEMICAL CO., LTD., Kyoto (JP)

( * ) Notice: Subject to any disclaimer, the term of this patent is extended or adjusted under 35 U.S.C. 154(b) by 806 days.

(21) Appl. No.: 17/042,998

(22) PCT Filed: Mar. 13, 2019

(86) PCT No.: PCT/JP2019/010211
§ 371 (c)(1),
(2) Date: Sep. 29, 2020

(87) PCT Pub. No.: WO2020/183635
PCT Pub. Date: Sep. 17, 2020

(65) Prior Publication Data
US 2021/0009476 A1 Jan. 14, 2021

(51) Int. Cl.
*C04B 35/626* (2006.01)
*C04B 35/26* (2006.01)
*C04B 35/634* (2006.01)
*C04B 35/64* (2006.01)
*C04B 37/00* (2006.01)
*H01G 4/30* (2006.01)

(52) U.S. Cl.
CPC .......... *C04B 35/6264* (2013.01); *C04B 35/26* (2013.01); *C04B 35/63416* (2013.01); *C04B 35/64* (2013.01); *C04B 37/001* (2013.01); *H01G 4/306* (2013.01); *C04B 2235/3272* (2013.01); *C04B 2237/34* (2013.01)

(58) Field of Classification Search
None
See application file for complete search history.

(56) References Cited

U.S. PATENT DOCUMENTS

| | | | |
|---|---|---|---|
| 6,596,799 B1 | 7/2003 | Harada | |
| 2003/0134926 A1 | 7/2003 | Fukada et al. | |
| 2003/0167634 A1 | 9/2003 | Nakao | |
| 2004/0260020 A1 | 12/2004 | Miyake et al. | |
| 2006/0096692 A1* | 5/2006 | Sato | H01G 4/1227 264/619 |
| 2008/0274376 A1 | 11/2008 | Kishida | |
| 2009/0054579 A1 | 2/2009 | Nakamae | |
| 2011/0049434 A1 | 3/2011 | Ootsuki et al. | |
| 2011/0091666 A1 | 4/2011 | Wang et al. | |
| 2012/0041123 A1* | 2/2012 | Ootsuki | C04B 35/581 524/390 |
| 2014/0256863 A1 | 9/2014 | Shimazumi | |
| 2017/0226298 A1 | 8/2017 | Friedrich et al. | |
| 2020/0385546 A1* | 12/2020 | Katahira | C08K 5/20 |

FOREIGN PATENT DOCUMENTS

| | | |
|---|---|---|
| CN | 1834146 A | 9/2006 |
| CN | 1310259 C | 4/2007 |
| CN | 101351483 A | 1/2009 |
| CN | 101384521 A | 3/2009 |
| CN | 103842313 A | 6/2014 |
| CN | 104250096 A | 12/2014 |
| CN | 105000906 A | 10/2015 |
| CN | 106687505 A | 5/2017 |
| CN | 107108920 A | 8/2017 |
| CN | 108911753 A | 11/2018 |
| JP | S5363409 A | 6/1978 |
| JP | S59156959 A | 9/1984 |
| JP | S62191458 A | 8/1987 |
| JP | H6237054 A | 8/1994 |
| JP | 200095572 A | 4/2000 |
| JP | 2000277372 A | 10/2000 |
| JP | 200189671 A | 4/2001 |
| JP | 2001106580 A | 4/2001 |
| JP | 2001302356 A | 10/2001 |

(Continued)

OTHER PUBLICATIONS

International Search Report in PCT/JP2019/010211, mailed May 14, 2019. 4pp.
International Search Report in PCT/JP2019/010212, mailed May 14, 2019. 4pp.
International Search Report in PCT/JP2019/010213, mailed May 28, 2019. 4pp.
Office Action in CN application No. 201980004470.6, dated Jul. 18, 2022. 36pp.
Office Action in CN application No. 201980004464.0, dated Jul. 8, 2022. 22pp.
Office Action in CN application No. 201980004463.6, dated Jul. 1, 2022. 25pp.

(Continued)

*Primary Examiner* — Robert T Butcher
(74) *Attorney, Agent, or Firm* — HAUPTMAN HAM, LLP

(57) ABSTRACT

A baking slurry composition of the present invention contains an amino alcohol compound represented by formula, inorganic powder, a polyvinyl alcohol resin, and water. In the formula,

[Chemical 1]

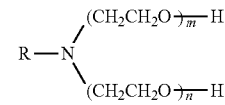

(1)

R is a hydrogen atom or an alkyl group having a carbon number larger than or equal to 1 and smaller than or equal to 20, and m and n being values satisfying conditions $m \geq 0$, $n \geq 0$, and $m+n \geq 1$.

14 Claims, No Drawings

(56) References Cited

FOREIGN PATENT DOCUMENTS

| | | | |
|---|---|---|---|
| JP | 200297069 | A | 4/2002 |
| JP | 2002284579 | A | 10/2002 |
| JP | 2003183325 | A | 7/2003 |
| JP | 2003192451 | A | 7/2003 |
| JP | 2004231428 | A | 8/2004 |
| JP | 2005113133 | A | 4/2005 |
| JP | 2005162572 | A | 6/2005 |
| JP | 2007261821 | A | 10/2007 |
| JP | 2007261941 | A | 10/2007 |
| JP | 2009182132 | A | 8/2009 |
| JP | 2011236304 | A | 11/2011 |
| JP | 201496231 | A | 5/2014 |
| JP | 2015202987 | A | 11/2015 |
| JP | 2017119606 | A | 7/2017 |
| JP | 20182991 | A | 1/2018 |
| JP | 201879616 | A | 5/2018 |
| TW | 200300137 | A | 5/2003 |
| TW | 201202404 | A1 | 1/2012 |
| WO | 2007126067 | A1 | 11/2007 |
| WO | 2008143195 | A1 | 11/2008 |
| WO | 2010055731 | A1 | 5/2010 |
| WO | 2018139405 | A1 | 8/2018 |

OTHER PUBLICATIONS

Office Action in TW application No. 109107756, dated Aug. 5, 2022. 15pp.
Office Action in TW application No. 109107794, dated Aug. 5, 2022. 13pp.

\* cited by examiner

BAKING SLURRY COMPOSITION, GREEN SHEET, METHOD FOR MANUFACTURING GREEN SHEET, METHOD FOR MANUFACTURING SINTERED PRODUCT, AND METHOD FOR MANUFACTURING MONOLITHIC CERAMIC CAPACITOR

CROSS-REFERENCE TO RELATED APPLICATION

This is the U.S. national stage of application No. PCT/JP2019/010211, filed on Mar. 13, 2019.

TECHNICAL FIELD

The present invention relates to baking slurry compositions, green sheets, methods for manufacturing the green sheets, methods for manufacturing sintered products, and methods for manufacturing monolithic ceramic capacitors. More specifically, the present invention relates to a baking slurry composition for producing a sintered product of inorganic powder, a green sheet containing a dried product of the baking slurry composition, a method for manufacturing the green sheet, a method for manufacturing the sintered product, and a method for manufacturing a monolithic ceramic capacitor.

BACKGROUND ART

Conventionally, an organic solvent, such as typically toluene, has been blended as a solvent with a baking binder composition, a baking slurry composition, and the like for producing a ceramic green sheet.

In recent years, emission regulations and the like for organic solvents have been strengthened with concerns about the effects of volatile organic compounds (VOCs) and the like on the environment and the human body. For this reason, a solvent to be blended with a baking binder composition, a baking slurry composition, and the like is required to be converted from an organic solvent into an aqueous solvent.

For example, Patent Literature 1 discloses a ceramic green sheet coating composition which is aqueous and which contains a ceramic raw material, a binder resin, solvent water, and a plasticizer.

It has, however, been difficult for the ceramic green sheet coating composition, which is disclosed in Patent Literature 1 and which is aqueous, to have increased flexibility while maintaining the strength of the sheet, although the ceramic green sheet coating composition, which is aqueous, has excellent coating properties at the time of forming the sheet.

CITATION LIST

Patent Literature

Patent Literature 1: JP 2002-284579 A

SUMMARY OF INVENTION

It is an object of the present invention to provide a baking slurry composition, a green sheet, a method for manufacturing the green sheet, a method for manufacturing a sintered product, and a method for manufacturing a monolithic ceramic capacitor, wherein in the case of forming the baking slurry composition into a sheet, the sheet has increased flexibility while increased strength of the sheet is maintained.

A baking slurry composition according to one aspect of the present invention contains an amino alcohol compound (A) represented by following formula (1), inorganic powder (B), a polyvinyl alcohol resin (C), and water.

[Chemical 1]

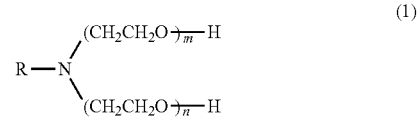

In the formula (1), R is a hydrogen atom or an alkyl group haring a carbon number larger than or equal to 1 and smaller than or equal to 20, and m and n are values satisfying conditions m≥0, n≥0, and m+n≥1.

A green sheet according to an aspect of the invention contains an amino alcohol compound (A) represented by following formula (1), inorganic powder (B), and a polyvinyl alcohol resin (C).

[Chemical 2]

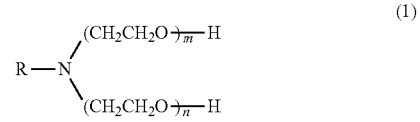

In the formula (1), R is a hydrogen atom or an alkyl group having a carbon number larger than or equal to 1 and smaller than or equal to 20, and m and n are values satisfying conditions m≥0, n≥0, and m+n≥1.

A method for manufacturing a green sheet according to one aspect of the present invention includes applying and drying a baking slurry composition containing an amino alcohol compound (A) represented by formula (1), inorganic powder (B), a polyvinyl alcohol resin (C), and water.

[Chemical 3]

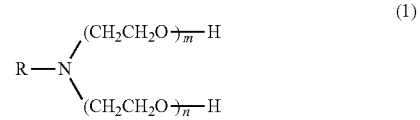

In the formula (1), R is a hydrogen atom or an alkyl group having a carbon number larger than or equal to 1 and smaller than or equal to 20, and m and n are values satisfying conditions m≥0, n≥0, and m+n≥1.

A method for manufacturing a sintered product according to one aspect of the present invention includes sintering the green sheet or a green sheet obtained by the method for manufacturing the green sheet.

A method for manufacturing a monolithic ceramic capacitor according to one aspect of the present invention includes sintering a stack obtained by stacking a plurality of the green sheets or a plurality of the green sheets obtained by the method for manufacturing the green sheet.

DESCRIPTION OF EMBODIMENTS

A baking slurry composition and a green sheet according to the present embodiment will be described in detail below. Note that in the following description, the "green sheet" may simply be referred to as a "sheet".

The baking slurry composition according to the present embodiment contains an amino alcohol compound (A) represented by following formula (1), inorganic powder (B), a polyvinyl alcohol resin (C), and water.

[Chemical 4]

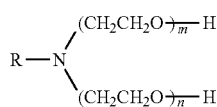
(1)

In the formula (1), R is a hydrogen atom or an alkyl group having a carbon number larger than or equal to 1 and smaller than or equal to 20, and m and n are values satisfying the conditions $m \geq 0$, $n \geq 0$, and $m+n \geq 1$.

In the baking slurry composition of the present embodiment, the amino alcohol compound (A) may function as a plasticizer. Moreover, the polyvinyl alcohol resin (C) may function as a binder. This enables increased strength and flexibility to be imparted to a sheet when the sheet is formed from the baking slurry composition. Furthermore, since the baking slurry composition contains the inorganic powder (B), heating and baking the baking slurry composition or the sheet (green sheet) formed from the baking slurry composition sinters the inorganic powder (B), and thereby, it is possible to form a sintered product from the baking slurry composition.

A reason why imparting the increased strength and flexibility to the sheet to be formed from the baking slurry composition is possible has not been clarified, but the following actions are presumed to be the reason.

The baking slurry composition contains the amino alcohol compound (A) and the polyvinyl alcohol resin (C) and may thus be soluble in water as a solvent. This enables efficient dispersion of components in the baking slurry composition although the baking slurry composition contains water as a solvent. Moreover, when the baking slurry composition contains the amino alcohol compound (A), the amino alcohol compound (A) which may be relatively low molecular and which may have a steric structure is likely to enter gaps between molecules of the polyvinyl alcohol resin (C) which is high molecular. Thus, the amino alcohol compound (A) is dispersed into all the gaps of a binder component (polyvinyl alcohol rein (C)), which probably facilitates plasticization of the binder component. In general, forming a sheet from polyvinyl alcohol enables strength to be imparted to the sheet, but in the case of the polyvinyl alcohol, film obtained is more likely to be hard. In contrast, in the present embodiment, the amino alcohol compound (A) functions as a plasticizer, which may impart increased flexibility to the sheet.

Moreover, each of the amino alcohol compound (A) and the polyvinyl alcohol resin (C) has hydroxyl groups in molecules, and these hydroxyl groups easily forms an interaction to a surface of the inorganic powder (B), which may probably contribute to the improvement of the strength of the sheet.

Moreover, basically, when the baking slurry composition contains the polyvinyl alcohol resin (C), adhesiveness to the inorganic powder (B) such as ceramics is strong, and therefore, a sheet formed from the baking slurry composition is easily caused to warp. Thus, it is difficult to obtain satisfactory adhesion to carrier film (base material) made of polyethylene terephthalate (PET) or the like. However, in the present embodiment, the amino alcohol compound (A) is further contained, and therefore, it is possible to improve the adhesiveness of the sheet to the base material. Moreover, in this case, the sheet formed on the substrate may have peel properties derived from the polyvinyl alcohol resin (C). Thus, in the baking slurry composition of the present embodiment, both satisfactory adhesiveness to the base member and satisfactory peel properties from the base member are realizable also when a sheet is formed from the baking slurry composition on the base material.

Moreover, in pressure bonding to form a sheet from the baking slurry composition of the present embodiment, the amino alcohol compound (A) entered in the gaps of the polyvinyl alcohol resin (C) functions at an interface, and therefore, the amino alcohol compound (A) can also contribute to the adhesiveness.

Next, the components included in the baking slurry composition according to the present embodiment will be described in detail.

[Amino Alcohol Compound (A)]

The amino alcohol compound (A) has a structure represented by following formula (1).

[Chemical 5]

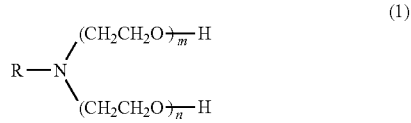
(1)

In the formula (1), R is a hydrogen atom or an alkyl group having a carbon number larger than or equal to 1 and smaller than or equal to 20, and m and n are values satisfying the conditions $m \geq 0$, $n \geq 0$, and $m+n \geq 1$.

The amino alcohol compound (A) is configured to impart high plasticizing effect to the baking slurry composition. Thus, a sheet formed from the baking slurry composition may have flexibility. Moreover, the amino alcohol compound (A) is configured to impart, to the sheet formed from the baking slurry composition, high adhesiveness to the base material such as PET.

As long as m and n in the formula (1) are values satisfying the conditions $m \geq 0$, $n \geq 0$, and $m+n \geq 1$, m and n may be accordingly set in accordance with the intended use. For example, m+n is preferably less than or equal to 50, more preferably less than or equal to 40, and even more preferably less than or equal to 30.

The amino alcohol compound (A) preferably has an HLB value of larger than or equal to 5 and smaller than or equal to 10. The HLB value is a numerical value representing a balance between hydrophilicity and hydrophobicity and is calculated based on the ratio between a hydrophilic group and a hydrophobic group.

The amino alcohol compound (A) is at least a compound selected from the group consisting, for example, of N-methylethanolamine, N-ethyl ethanolamine, N-t-butylethanolamine, diethanolamine, N-methyldiethanolamine, N-n-butyldiethanolamine, N-t-butyldiethanolamine, N-lauryldiethanolamine, N-stearyl diethanolamine, polyoxyethylenedodecylamine, polyoxyethylene lauryl amine, and polyoxymethylene stearylamine.

The amino alcohol compound (A) preferably contains an amino alcohol compound (A1) represented by following formula (2).

[Chemical 6]

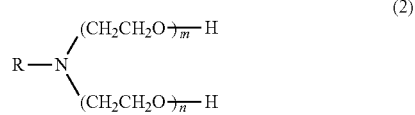

(2)

In the formula (2), R is preferably an alkyl group having a carbon number larger than or equal to 10 and smaller than or equal to 20, m and n are values satisfying the conditions m≥0, n≥0, and (n+m)≥1. In this case, the amino alcohol compound (A1) contains a hydrophilic hydroxyl group and a lipophilic alkyl group. Thus, it is possible to impart particularly enhanced flexibility and strength in a balanced manner to a sheet formed from the baking slurry composition. Conventionally, glycerin, ethylene glycol, propylene glycol, polyethyleneglycol, or the like has been blended as a plasticizer with a baking slurry composition, but these plasticizers are components which easily absorb water, and therefore, moisture easily enters the polyvinyl alcohol resin (C) serving as the binder. In contrast, when the baking slurry composition contains, in particular, the amino alcohol compound (A1), the lipophilic alkyl group of the amino alcohol compound (A1) is more likely to appear at a surface of the sheet as compared to the hydrophilic hydroxyl group, and therefore, it is possible to impart water resistance to the sheet. Thus, also when the sheet is stored, it is possible to suppress moisture or the like in air from entering the sheet. Thus, it is possible to reduce breakage of the sheet caused due to evaporation or the like of moisture in the sheet in the case of baking the sheet formed from the baking slurry composition. In the formula (2), R more preferably has a carbon number larger than or equal to 10 and smaller than or equal to 15.

The amino alcohol compound (A1) preferably contains at least one compound selected from the group consisting of polyoxyethylenedodecylamine, polyoxyethylene lauryl amine, and polyoxyethylene stearylamine.

The amount of the amino alcohol compound (A) to 100 parts by mass of the polyvinyl alcohol resin (C) is preferably greater than or equal to 2 parts by mass and less than or equal to 75 parts by mass. When the amount of the amino alcohol compound (A) is within this range, it is possible to suppress seeping of the amino alcohol compound (A) in the baking slurry composition. In addition, in this case, it is possible to reduce volatilization of the amino alcohol compound (A), and thus, storage stability of the baking slurry composition can be improved, and foaming of the baking slurry composition can also be suppressed. Thus, also when a sheet is formed from the baking slurry composition, void is less likely to be formed, and the surface of the sheet is less likely to be uneven, and thus, it is possible to maintain the smoothness of the sheet. The amount of the amino alcohol compound (A) to 100 parts by mass of the polyvinyl alcohol resin (C) is more preferably greater than or equal to 4 parts by mass and less than or equal to 30 parts by mass, even more preferably greater than or equal to 6 parts by mass and less than or equal to 20 parts by mass.

[Inorganic Powder (B)]

The inorganic powder (B) may include an appropriate material depending on properties required by the sintered product to be produced from the inorganic powder (B). For example, the inorganic powder (B) may contain a conductive material or may contain a dielectric material. Specifically, the inorganic powder (B) contains at least one material selected from the group consisting, for example, of oxide, carbide, boride, sulfide, and nitride of metal. The metal contains at least one selected from the group consisting, for example, of Au, Ag, Cu, Li, Pd, K, Be, Mg, B, Al, Si, Ca, Sr, Ba, Zn, Cd, Ga, In, lanthanide, actinide, Ti, Zr, Hf, Bi, V, Nb, Ta, W, Mn, Fe, Ca, and Ni. When the inorganic powder (B) contains a plurality of metal elements, the inorganic powder (B) may contain one or more components selected from the group consisting, for example, of Macerite, barium titanate, silicate glass, ferrite, lead glass, $CaO.Al_2O_3.SiO_2$-based inorganic glass, $MgO.Al_2O_3.SiO_2$-based inorganic glass, and $LiO_2.Al_2O_3.SiO_2$-based inorganic glass. The inorganic powder (B) particularly preferably contains at least one material selected from the group consisting of: an oxide containing aluminum, a nitride containing silicon, ferric oxide, and a barium titanate. The oxide containing aluminum includes at least one material selected from the group consisting, for example, of $CaO.Al_2O_3.SiO_2$-based inorganic glass, $MgO.Al_2O_3.SiO_2$-based inorganic glass, and $LiO_2.Al_2O_3.SiO_2$-based inorganic glass.

Note that the inorganic powder (B) of the present embodiment is an aggregate (powder) of powdery particles having a mean particle diameter of 10 μm or smaller. The mean particle diameter is a median diameter (D50) based on a volume calculated from particle size distribution values measured by, for example, a laser diffraction/scattering method. The mean particle diameter is obtainable with a commercially available particle size analyzer of a laser diffraction/scattering method.

[Polyvinyl Alcohol Resin (C)]

The polyvinyl alcohol resin (C) is a resin which functions as a binder in the baking slurry composition. The polyvinyl alcohol resin (C) can satisfactorily adsorb the inorganic powder (B). This enables the dispersibility of the inorganic powder (B) in the baking slurry composition to be improved. Thus, the polyvinyl alcohol resin (C) may improve the storage stability of baking slurry composition.

Note that in the present embodiment, the polyvinyl alcohol resin (C) includes at least one member selected from the group consisting of polyvinyl alcohol obtained by fully saponifying poly vinyl acetate, polyvinyl alcohol obtained by partially saponifying polyvinyl acetate, and a modified product obtained by modifying part of a hydroxyl group or part of an acetic acid group (acetyloxy group) of the structure of polyvinyl alcohol.

The polyvinyl alcohol resin (C) preferably has an average degree of polymerization higher than or equal to 500 and lower than or equal to 9000. In this case, the polyvinyl alcohol resin (C) is readily soluble in water. Moreover, in this case, the polyvinyl alcohol resin (C) more easily adsorbs the inorganic powder (B) and thus enables the dispersibility of the inorganic powder (B) in baking slurry composition to be further improved. The average degree of polymerization of the polyvinyl alcohol resin (C) is more preferably higher than or equal to 500 and lower than or equal to 4000, and even more preferably higher than or equal to 1500 and lower than or equal to 4000. The average degree of polymerization is calculable from a relative viscosity of the polyvinyl alcohol resin (C) to water, the relative viscosity being obtained by using an Ostwald viscometer after full saponification of the polyvinyl alcohol resin (C) with sodium hydroxide.

Components that may be contained in the polyvinyl alcohol resin (C) will be described in further detail.

The polyvinyl alcohol resin (C) preferably contains a nonionic polyvinyl alcohol resin (C1) and an anionic polyvinyl alcohol resin (C2). In this case, the strength of the sheet formed from the baking slurry composition can be further improved. Specifically, the anionic polyvinyl alcohol resin (C2) may have higher hydrophilicity than the nonionic polyvinyl alcohol resin (C1). Therefore, the anionic polyvinyl alcohol resin (C2) can contribute to the further improvement of the strength of the sheet. The polyvinyl alcohol resin (C) contains not only the nonionic polyvinyl alcohol resin (C1) but also the anionic polyvinyl alcohol resin (C2), and therefore, the balance between the physical property and pH of the baking slurry composition can be easily adjusted. Therefore, aggregation and gelation are less likely to occur in the case of paste being produced from the baking slurry composition. The ratio of the nonionic polyvinyl alcohol resin (C1) to the total amount of the nonionic polyvinyl alcohol resin (C1) and the anionic polyvinyl alcohol resin (C2) is preferably more than or equal to 30 wt. % and less than or equal to 90 wt. %, more preferably more than or equal to 40 wt. % and less than or equal to 85 wt. %.

The anionic polyvinyl alcohol resin (C2) preferably contains an anionic polyvinyl alcohol resin (C21) having a carboxyl group. In this case, the interaction between the carboxyl group of the anionic polyvinyl alcohol resin (C21) and the inorganic powder (B) becomes further intensified, and the strength of the sheet can thus be further improved. In addition, in this case, it is easier to adjust the balance between the physical property and the pH of the baking slurry composition. Therefore, it is possible to reduce the occurrence of aggregation and gelation in the case of paste being produced from the baking slurry composition. This enables the physical property of the sheet to be further improved.

Specific examples of commercially available products as the anionic polyvinyl alcohol resin (C21) having a carboxyl group include: KL-506, KL-318, and KL-118 which are names of products manufactured by Kuraray Co., Ltd., GOHSENX T-330, T-350, and T-330H which are names of products manufactured by Nippon Synthetic Chemical Co., Ltd., and AP-17, AT-17, and AF-17 which are names of products manufactured by JAPAN VAM & POVAL CO., LTD.

The polyvinyl alcohol resin (C) may contain, for example, at least two components having differing degrees of saponification. It is also preferable that the polyvinyl alcohol resin (C) contains a component (C3) having a saponification degree of more than or equal to 85 mol % and less than or equal to 99 mol %, and a component (C4) having a saponification degree of more than or equal to 60 mol % and less than 85 mol %. In this case, the component (C3) has a higher percentage of hydroxyl groups than the component (C4), and therefore, the component (C3) can contribute to the improvement of the strength of the sheet formed from the baking slurry composition, while the component (C4) can contribute to the improvement of the flexibility of the sheet. Thus, it is possible to impart further increased strength and flexibility to the sheet to be formed from the baking slurry composition. The component (C4) more preferably has a saponification degree of more than or equal to 60 mol % and less than 80 mol %. The ratio of the component (C3) to the total amount of the component (C3) and the component (C4) is preferably more than or equal to 30 wt. % and less than 90 wt. %, and more preferably more than or equal to 40 wt. % and less than or equal to 85 wt. %.

The degree of saponification is calculable by, for example, measuring the polyvinyl alcohol resin in accordance with, for example, JIS K6726 (1994), and based on results of the measuring, it is possible to determine that the degrees of saponification of the components contained in the polyvinyl alcohol resin (C) differ from each other.

The component (C3) and the component (C4) are components distinguished from each other based on the saponification degree as described above. Therefore, the component (C3) and the component (C4) may be either nonionic or anionic. Therefore, the component (C3) and the component (C4) may overlap with a component included in either the nonionic polyvinyl alcohol resin (C1) or the anionic polyvinyl alcohol resin (C2).

The nonionic polyvinyl alcohol resin (C1) preferably contains a nonionic polyvinyl alcohol resin (C11) having a saponification degree of more than or equal to 85 mol % and less than or equal to 99 mol % and a nonionic polyvinyl alcohol resin (C12) having a saponification degree of more than or equal to 60 mol % and less than 85 mol %, and the anionic polyvinyl alcohol resin (C2) preferably contains the anionic polyvinyl alcohol resin (C21) having the carboxyl group. That is, the polyvinyl alcohol resin (C) preferably contains the nonionic polyvinyl alcohol resin (C11), the nonionic polyvinyl alcohol resin (C12), and the anionic polyvinyl alcohol resin (C21). In this case, the nonionic polyvinyl alcohol resin (C11) has a higher percentage of hydroxyl groups than the nonionic polyvinyl alcohol resin (C12) and can therefore contribute to the improvement of the strength of the sheet to be formed from the baking slurry composition. In addition, since the polyvinyl alcohol resin (C21) has the carboxyl group, the contribution of the polyvinyl alcohol resin (C21) to the improvement of the strength of the sheet is even greater. On the other hand, the polyvinyl alcohol resin (C12) can contribute to the improvement of the flexibility of the sheet. Thus, it is possible to impart further increased strength and flexibility to the sheet to be formed from the baking slurry composition. The nonionic polyvinyl alcohol resin (C12) more preferably has a saponification degree of more than or equal to 60 mol % and less than 80 mol %. The ratio of the polyvinyl alcohol resin (C21) to the total amount of the polyvinyl alcohol resin (C11), the polyvinyl alcohol resin (C12), and the polyvinyl alcohol resin (C21) is preferably more than or equal to 10 wt. % and less than or equal to 50 wt. %, more preferably more than or equal to 20 wt. % and less than or equal to 40 wt. %.

It is also preferable that the nonionic polyvinyl alcohol resin (C1) contains a nonionic polyvinyl alcohol resin (C11) having a saponification degree of more than or equal to 85 mol % and less than or equal to 99 mol %, and the polyvinyl alcohol resin (C21) contains an anionic polyvinyl alcohol resin (C211) having a saponification degree of more than or equal to 60 mol % and less than 85 mol % and a carboxyl group. That is, the polyvinyl alcohol resin (C) preferably contains both the nonionic polyvinyl alcohol resin (C11) and the anionic polyvinyl alcohol resin (C211). In this case, the polyvinyl alcohol resin (C11) has a higher percentage of hydroxyl groups than the polyvinyl alcohol resin (C21) and can therefore contribute to the improvement of the strength of the sheet formed from the baking slurry composition. Although the ratio of the hydroxyl group in the polyvinyl alcohol resin (C211) is smaller than that in the polyvinyl alcohol resin (C11), the polyvinyl alcohol resin (C211) has the carboxyl group, and therefore, the polyvinyl alcohol resin (C211) can contribute to the improvement of the strength while the increased flexibility of the sheet is maintained. Thus, it is possible to impart further increased strength and flexibility to the sheet to be formed from the baking slurry composition. The saponification degree of the anionic polyvinyl alcohol resin (C211) having the carboxyl group is more preferably more than or equal to 60 mol % and less than 80 mol %. The ratio of the polyvinyl alcohol resin (C211) to the total amount of the polyvinyl alcohol resin (C11) and the polyvinyl alcohol resin (C211) is preferably more than or equal to 10 wt. % and less than or equal to 70 wt. %, and more preferably more than or equal to 15 wt. % and less than or equal to 60 wt. %.

Specific examples of commercially available products of the nonionic polyvinyl alcohol resin (C11) having a saponification degree of more than or equal to 85 mol % and less than or equal to 99 mol % include PVA-235, PVA-217, PVA-105, PVA-117, PVA-124, PVA-205, and PVA-224 which are names of product manufactured by Kuraray Co., Ltd.; Denka Poval K-05, K-17C, and H-17, B-20 which are names of products manufactured by Denka Corporation; and JC-33, JF-05, JM-23, and JP-03 which are names of product manufactured by JAPAN VAM & POVAL CO., LTD.

Specific examples of commercially available products as the nonionic polyvinyl alcohol resin (C12) having a saponification degree of more than or equal to 60 mol % and less than 85 mol % include PVA-505, PVA-405, PVA-417, and PVA-420 which are names of products manufactured by Kuraray Co., Ltd., GOHSENOL KL-05, KL-03, KH-20, KH-17, KP-08R, and NK-05R which are names of products manufactured by the Nippon Synthetic Chemical Industry Co., Ltd., and JL-05E, JL-22E, JL-25E, and JR-05 which are names of products manufactured by JAPAN VAM & POVAL CO., LTD.

Specific examples of commercially available products as the anionic polyvinyl alcohol resin (C211) having a saponification degree of more than or equal to 60 mol % and less than 85 mol % and having a carboxyl group include KL-506 which is a name of a product manufactured by Kuraray Co., Ltd. Note that the anionic polyvinyl alcohol resin (C211) is included in the anionic polyvinyl alcohol resin (C2).

Note that the polyvinyl alcohol resin (C) may contain, for example, a cationic polyvinyl alcohol resin in addition to the nonionic polyvinyl alcohol resin (C1) and the anionic polyvinyl alcohol resin (C2). The polyvinyl alcohol resin (C) may contain the above-described component having a saponification degree of less than 60 mol %.

[Solvent]

In the present embodiment, the baking slurry composition contains water. Components of the baking slurry composition are highly dispersible in water even when water is blended as a solvent. Thus, the baking slurry composition can have high storage stability. Since the baking slurry composition has high dispersibility, a sheet formed from the baking slurry composition has high smoothness. Note that the baking slurry composition may contain a solvent other than water. The solvent other than water may contain at least one selected from the group consisting, for example, of methanol, ethanol, propyl alcohol, isopropyl alcohol, propylene glycol monomethyl ether, ethylene glycol, ethylene glycol monoethyl ether, ethylene glycol monobutyl ether, ethylene glycol monotertiarybutyl ether, polyethylene glycol monomethyl ether, and 2-Hydroxyisobutyric acid methyl ester.

[Other Components]

The baking slurry composition may contain components such as an additive other than the components described above. Examples of the additive include: a dispersant, a plasticizer, a defoamant, a rheology-controlling agent, a wetting agent, an adhesiveness-imparting agent, and a surfactant.

The baking slurry composition according to the present embodiment can be prepared by mixing and stirring, for example, the amino alcohol compound (A), the inorganic powder (B), the polyvinyl alcohol resin (C), water, and optionally, additives such as a solvent and a dispersant to disperse these components.

The amounts of the components composing the baking slurry composition may be set accordingly. For example, the amount of the amino alcohol compound (A) with respect to the total amount of the inorganic powder of the baking slurry composition and the solid content of the binder is preferably more than or equal to 0.1 wt. % and less than or equal to 8.0 wt. %, more preferably more than or equal to 0.3 wt. % and less than or equal to 5.0 wt. %, and even more preferably more than or equal to 0.5 wt. % and less than or equal to 3.0 wt. %.

The weight percentage of the inorganic powder (B) relative to the total solid content of baking slurry composition is, for example, preferably more than or equal to 75 and less than or equal to 95, more preferably more than or equal to 80 and less than or equal to 95, and even more preferably more than or equal to 85 and less than or equal to 95.

The weight percentage of polyvinyl alcohol resin (C) to the inorganic powder (B) of the baking slurry composition is, for example, preferably more than or equal to 1 and less than or equal to 20, more preferably more than or equal to 5 and less than or equal to 15, and even more preferably more than or equal to 8 and less than or equal to 12.

The amount of water relative to the total amount of the baking slurry composition is preferably more than or equal to 6 wt. % and less than or equal to 45 wt. %, more preferably more than or equal to 8 wt. % and less than or equal to 40, and even more preferably more than or equal to 10 wt. % and less than or equal to 37 wt. %.

Note that "total solids content of the baking slurry composition" refers to the total amount of components obtained by converting the components included in the baking slurry into solid contents, and "total amount of the baking slurry composition" refers to the total amount of fluid components and solid components in the components included in the baking slurry.

The baking slurry composition may include an aqueous solution of the polyvinyl alcohol resin (C), that is, the baking slurry composition may be adjusted by dissolving the polyvinyl alcohol resin (C) in water in advance to obtain an aqueous solution and then by blending the aqueous solution with other components.

The baking slurry composition preferably has a pH of higher than or equal to 5 and lower than 8. In this case, agglomeration, gelation, and phase separation of the baking slurry composition are less likely to occur, and therefore, the storage stability of the baking slurry composition can be further improved. Thus, when a sheet is formed from the baking slurry composition, the sheet can be finished as a flexible sheet. The pH of the baking slurry composition is more preferably 6 or higher and 7 or lower. The pH of the baking slurry composition is adjustable, for example, by accordingly adjusting blending amounts of the amino alcohol compound (A) and the polyvinyl alcohol resin (C) (in the present embodiment, the anionic polyvinyl alcohol resin (C2)).

[Green-Sheet]

A green sheet according to the present embodiment contains: an amino alcohol compound (A) represented by following formula (1); inorganic powder (B); and a polyvinyl alcohol resin (C).

[Chemical 7]

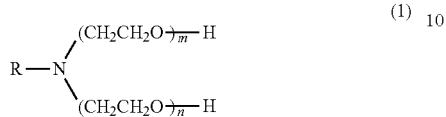

(1)

In the formula (1), R is a hydrogen atom or an alkyl group having a carbon number larger than or equal to 1 and smaller than or equal to 20, and m and n are values satisfying the conditions m≥0, n≥0, and m+n≥1.

Thus, the green sheet of the present embodiment has increased strength and flexibility. Therefore, forming a sheet from the baking slurry composition enables flexibility to be imparted to the sheet as described above and thus enables the sheet to be hardly warped. This enables the adhesiveness of the sheet to a base material such as carrier film to be improved. Therefore, it is also possible to reduce the formation of cracks in the green sheet of the present embodiment.

The amino alcohol compound (A), the inorganic powder (B), and the polyvinyl alcohol resin (C) have the same configurations as those of the above-described baking slurry composition, and therefore, duplicate descriptions thereof are omitted.

The green sheet can be produced, for example, as described below.

After preparing the baking slurry composition described above, the baking slurry composition is applied to a base material and is optionally dried to obtain a green sheet. Any appropriate method is adoptable as a method for applying the baking slurry composition to the base material, and examples of the method include a doctor blade method, a screen printing method, and a dispensing method. Any appropriate base material is adoptable as the base material to which the baking slurry composition is to be applied, and examples of the base material may include carrier film such as polyethylene terephthalate (PET) film.

The green sheet of the present embodiment is suitably utilizable in an application as a ceramic green sheet for producing a monolithic ceramic capacitor and the like. Baking the green sheet pyrolyzes and removes components such as the amino alcohol compound (A) and the polyvinyl alcohol resin (C), thereby sintering the inorganic powder (B). This forms a sintered product of the inorganic powder (B), and the sintered product may form appropriate elements such as electrodes and conductor wiring. For example, appropriate elements such as a conductive layer, a dielectric layer, and an insulating layer are producible from the green sheet. Specifically, for example, the green sheet is adoptable to produce a dielectric layer in a monolithic ceramic capacitor, an insulating layer in a ceramic circuit board, and the like. As described above, the green sheet of the present embodiment has increased strength and flexibility, and therefore, also when a plurality of the green sheets are stacked to produce a monolithic ceramic capacitor, reducing the thickness of the monolithic ceramic capacitor is easily possible.

The monolithic ceramic capacitor can be produced from the green sheet by, for example, the following method.

First, the green sheet is cut to obtain green sheets having an appropriate dimension, and a suitable number of the green sheets are stacked on each other according to the purpose. Subsequently, pressure is applied to compress the green sheets stacked, and then the green sheets stacked are put in a baking oven and are then baked. The dielectric layer in the monolithic ceramic capacitor, the insulating layer in the ceramic circuit board, and the like are thus produced.

The pressure to be applied to the green sheets stacked is not particularly limited but may be accordingly set depending on, for example, the number of stacked green sheets, and may be, for example, more than or equal to 10 MPa and less than or equal to 100 MPa. The baking condition may accordingly be set depending on the temperature at which the inorganic powder (B) is to be sintered, but the heating temperature may be set to, for example, 500° C. or higher and 1500° C. or lower, and the heating time may be set to, for example, 1 hour or longer and 24 hours or shorter. Note that the monolithic ceramic capacitor produced from the plurality of green sheets has been described above, but a single-layered ceramic capacitor may be produced from a single green sheet having an appropriate dimension.

EXAMPLES

The present invention will be described further in detail with reference to examples below. However, the present invention is not limited to the following examples.

(1) Preparation of Baking Slurry Compositions [Examples 1 to 34 and Comparative Examples 1 to 10]

Components shown in column A (columns corresponding to "inorganic powder", "solvent", "dispersant" and "amino alcohol compound") in Tables 1 to 4 were placed in a ball mill to obtain a mixture and were stirred with the ball mill for 30 minutes to disperse the mixture. Subsequently, components in column B (columns corresponding to "defoamant", and "polyvinyl alcohol resin") in Tables 1 to 4 were further added and stirred in the ball mill for 8 hours for dispersion, thereby preparing a baking slurry composition.

Details of the components shown in Tables 1 to 4 are as shown below.

[Inorganic Powder]
  Iron Oxide
[Dispersant]
  Polyacrylic acid ammonium salt aqueous solution (Micro-Sol KE-511 manufactured by GOO chemical Co., Ltd.; 40% aqueous solution).
[Amino Alcohol Compound]
  AMIET 105 (manufactured by Kao Corporation, polyoxyethylene lauryl amine, HLB: 9.8).
  AMIET 302 (manufactured by Kao Corporation, polyoxyethylene stearylamine, HLB: 5.1).
  AMIET 320 (manufactured by Kao Corporation, polyoxyethylene stearylamine, HLB: 15.4).
  Nymeen L-207 (manufactured by NOF CORPORATION, polyoxyethylene lauryl amine, HLB: 12.5).
  Nymeen L-201 (manufactured by NOF CORPORATION, polyoxyethylene lauryl amine, HLB: 3.8).
  Nymeen S-210 (manufactured by NOF CORPORATION, polyoxyethylene stearylamine, HLB: 12.5).
  Blaunon L-230 (manufactured by AOKI OIL INDUSTRIAL Co., Ltd., polyoxyethylene lauryl amine, HLB: 17.5).

Blaunon S-230 (manufactured by AOKI OIL INDUSTRIAL Co., Ltd., polyoxyethylene stearylamine, HLB: 16.7).

HI-MOL PM (manufactured by TOHO Chemical Industry Co., Ltd., Polyethylene glycol monomethyl ether).

DOA (Bis(2-ethylhexyl) adipate).

Epocizer W-131 (manufactured by DIC Corporation, epoxy fatty acid 2-ethylhexyl).

PEG-600 (polyoxyethylene glycol (molecular weight 600)).

AMP-100 (2-Amino-2-methyl-1-propanol).

[Defoamant]

SN-Defoamer 470 (manufactured by San Nopco Limited: a mixture of polyether, modified silicone compounds, and the like).

SN-Deformer 485 (manufactured by San Nopco Limited: a mixture of special polyether nonionic surfactant).

[Polyvinyl Alcohol Resin]

PVA-235 aqueous solution (manufactured by Kuraray Co., Ltd., concentration: 15%, degree of saponification: 88 mol %, and average degree of polymerization: 3500).

KL-506 aqueous solution (manufactured by Kuraray Co., Ltd., density: 30%, degree of saponification: 77 mol %, carboxyl group is contained, average degree of polymerization: 600).

KL-318 aqueous solution (manufactured by Kuraray Co., Ltd., density: 30%, degree of saponification: 88 mol %, carboxyl group is contained, average degree of polymerization: 1800).

PVA-217 aqueous solution (manufactured by Kuraray Co., Ltd., concentration: 20%, degree of saponification: 88 mol %, average degree of polymerization: 1700).

GOHSENOL KL-05 aqueous solution (manufactured by Nippon Synthetic Chemical Co., Ltd., concentration: 30%, degree of saponification: 80 mol %, average degree of polymerization: 500).

PVA-505 aqueous solution (manufactured by Kuraray Co., Ltd., concentration: 30%, degree of saponification: 74 mol %, average degree of polymerization: 500).

KL-118 aqueous solution (manufactured by Kuraray Co., Ltd., concentration: 30%, degree of saponification: 98 mol %, carboxyl group is contained, average degree of polymerization: 1800).

PVA-205 aqueous solution (manufactured by Kuraray Co., Ltd., concentration: 30%, degree of saponification: 88 mol %, average degree of polymerization: 500).

PVA-105 aqueous solution (manufactured by Kuraray Co., Ltd., concentration: 30%, degree of saponification: 98 mol %, average degree of polymerization: 500).

PVA-117 aqueous solution (manufactured by Kuraray Co., Ltd., concentration: 30%, degree of saponification: 98 mol %, average degree of polymerization: 1700).

HPC-SSL aqueous solution (manufactured by Nippon Soda Co., Ltd., concentration: 15%, hydroxypropylcellulose).

JMR-500P aqueous solution (manufactured by Kuraray Co., Ltd., concentration: 10%, degree of saponification: 86 mol %, average degree of polymerization: 6000).

JMR-800HH aqueous solution (manufactured by Kuraray Co., Ltd., concentration: 8%, degree of saponification: 98 mol %, average degree of polymerization: 9000).

Note that the polyvinyl alcohol resins described in [Polyvinyl Alcohol Resin] were mixed by adjusting respective aqueous solutions containing the polyvinyl alcohol resins dissolved in water to achieve the concentrations described in the brackets. Values in the tables indicate the amounts of the respective aqueous solutions of the polyvinyl alcohol resins at the concentrations.

(2) Evaluation Test

An evaluation test of baking slurry resin compositions and sheets produced from the baking slurry resin compositions in the examples and comparative examples obtained in (1) was conducted as described below. The results are shown in the tables below.

(2-1) pH

Water is added to 100 g of the baking slurry composition prepared in (1) for dilution to obtain an aqueous solution adjusted such that the baking slurry composition has a concentration of 10%, and the pH of the aqueous solution was measured with a pH meter (model number PH711) manufactured by Yokogawa Electric Corporation.

(2-2) Slurry Stability (Storage Stability)

The baking slurry compositions prepared in (1) were left to stand at an ordinary temperature and stored for 4 weeks. During the 4-week period after adjustment of the baking slurry compositions, the baking slurry compositions were visually observed to check the presence or absence of phase separations, the presence or absence of sedimentation, and changes in appearance, and evaluated in accordance with the criteria described below.

A: Four weeks after the production, no change in appearance was observed.

B: Two weeks after the production, there was no change in appearance, but a change was observed after 4 weeks.

C: A change was observed within 2 weeks after 1 day had elapsed since the production.

D: A state change was observed within 1 day after the production, and the slurry composition was in an uneven state.

(2-3) Pyrolysis Behavior

In (1), the baking slurry compositions were prepared without blending the inorganic powder described in [Inorganic Powder], coatings were produced from these compositions, and while the coatings were heated from a room temperature to 550° C. under the presence of air at a rate of temperature rise of 10° C./min, weight changes of the coatings were measured by using a difference dynamic differential thermal balance (model number TG8120 manufactured by Rigaku Corporation). As a result, a weight reduction rate at 550° C. relative to the weight of each baking slurry composition at the room temperature was calculated and evaluated according to the following criteria.

A: The weight reduction rate of the baking slurry composition at 550° C. was more than or equal to 99 wt. %, and no calcination residue was observed.

B: The weight reduction rate of the baking slurry composition at 550° C. was more than or equal to 99 wt. %, but few baking residues were observed.

C: The weight reduction rate of the baking slurry composition at 550° C. was more than or equal to 95 wt. % and less than 99 wt. %.

D: The weight reduction rate of the baking slurry composition at 550° C. was less than 95 wt. %, and a residue such as carbide was visually observed after the measurements were completed.

Note that in this evaluation, a coating produced from the baking slurry composition without adding the inorganic powder was evaluated for the sake of measurement, but this does not affect the evaluation of the pyrolysis behavior.

(2-4) Smoothness

The baking slurry compositions prepared in (1) were applied on polyethylene terephthalate (PET) film (dimension: 100 mm×100 mm) with a four-sided applicator (model No. 112 manufactured by Taiyu Kizai Co., Ltd.) to have a thickness of about 100 μm and dried to form a coating. The appearance of each coating thus obtained was observed and evaluated according to the following criteria.

A: No irregularities, aggregates, bubble marks, warpage, or the like were observed in the coating, and the coating surface is uniform and smooth.

B: The coating surface is uniform and smooth to the extent that there is no problem as a product, although some irregularities, aggregates, bubble marks, warpage, etc. were observed in the coating.

C: irregularities, aggregates, bubble marks, warpage, or the like in the coating are observed in less than 50% of the area of the coating, and a uniform and smooth coating cannot be obtained.

D: irregularities, aggregates, bubble marks, warpage, or the like in the coating are observed in 50% or more of the area of the coating, and a uniform and smooth coating cannot be obtained.

(2-5) Strength

The coatings formed on the PET film in (2-4) were peeled off slowly by hand in a direction perpendicular to the surface of the PET film, and the strengths of the coatings were evaluated in accordance with the following criteria.

A: The coating is peelable from the PET film and can withstand tension. In addition, the strength is maintained after 2 weeks or more.

B: The coating is peelable from the PET film and can withstand tension, but a reduction of the strength is observed after 2 weeks or more.

C: The coating is peelable from the PET film but easily tears when pulled.

D: The coating cannot be peeled from the PET film or tears when peeled.

(2-6) Flexibility

The coatings formed on the PET film in (2-4) were bent to about 180° to check whether or not cracks were formed or breakage occurred in the coatings, and the coatings were evaluated according to the following criteria.

A: After the coating was bent at 180° more than 20 times, neither cracks nor breakage occurred in the coating.

B: After the coating was bent at 180° twice or more, neither cracks nor breakage occurred in the coating, but after the coating was bent 20 times or more, cracks and breakages occurred in the coating.

C: After the coating was bent at 180° more than twice, cracks and/or breakages occurred in the coating.

D: When the coating was bent at 180° at least once, cracks and cracks occurred in the coating.

(2-7) Adhesiveness

Each coating formed on the PET film in (2-4) was cut into coating pieces having a square shape (3-cm square) having a length of 3 cm and a width of 3 cm, 10 coating pieces were stacked, and then pressed using a press to remove the stacked layer film, thereby evaluating the adhesiveness according to the following criteria. Note that pressure was applied at 120° C. for 20 MPa×10 minutes.

A: The adhesiveness of the coating is strong and cannot be peeled off at the interface. In addition, the adhesiveness is maintained after 2 weeks or more.

B: The adhesiveness of the coating is strong and cannot be peeled off at the interface, but the adhesiveness decreases after 2 weeks or more.

C: If the coating is peeled off strongly by hand, the coating peels off at the interface.

D: The coatings are not bonded to each other at all.

(2-8) Water Resistance

The weight of the coating formed on the PET film in (2-4) was measured, the coating was then stored at a temperature of 40° C. and humidity of 80% for one week, and thereafter, the weight of the coting was measured. The ratio of increase in weight before and after the storage was computed and evaluated based on the following criteria. As the ratio of increase in weight of the coating decreases, the coating absorbs less water, and thus, it is determined that a sheet with a coating having a small ratio of increase in weight is a sheet having high water resistance.

A: The ratio of increase in weight was lower than 1%.

B: The ratio of increase in weight was higher than or equal to 1% and lower than 5%.

C: The ratio of increase in weight was higher than or equal to 5% and lower than 10%.

D: The ratio of increase in weight was higher than or equal to 10%.

The results of the evaluations are given in the following Tables 1 to 4.

TABLE 1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| A | Inorganic Powder | Ferric Oxide | 20 | 20 | 20 | 20 | 20 | 20 | 20 | 20 | 20 | 20 | 20 |
| | Solvent | Water | 4 | 4 | 4 | 4 | 4 | 4 | 4 | 4 | 4 | 4 | 4 |
| | Dispersant | Polyacrylic Acid Ammonium Salt Aqueous Solution | 0.2 | 0.2 | 0.2 | 0.2 | 0.2 | 0.2 | 0.2 | 0.2 | 0.2 | 0.2 | 0.2 |
| | Amino Alcohol Compound | AMIET 105 | 0.3 | | | | | | | | | | 0.3 |
| | | AMIET 302 | | 0.3 | | 0.2 | | | | | | | |
| | | EMIET 320 | | | 0.3 | | | | | | | | |
| | | Diethanolamine | | | | 0.3 | 0.5 | | | | | | |
| | | Nymeen L-207 | | | | | | 0.3 | | | | | |
| | | Nymeen L-201 | | | | | | | 0.3 | | | | |
| | | Nymeen S-210 | | | | | | | | 0.3 | | | |
| | | Blaunon L-230 | | | | | | | | | 0.3 | | |
| | | Blaunon S-230 | | | | | | | | | | 0.3 | |

TABLE 1-continued

|   |   |   | Example |   |   |   |   |   |   |   |   |   |   |
|---|---|---|---|---|---|---|---|---|---|---|---|---|---|
|   |   |   | 1 | 2 | 3 | 4 | 5 | 6 | 7 | 8 | 9 | 10 | 11 |
| B | Defoamant | SN Defoamer 470 | 0.05 | 0.05 | 0.05 | 0.05 | 0.05 | 0.05 | 0.05 | 0.05 | 0.05 | 0.05 | 0.05 |
|   |   | SN Defoamer 485 | 0.05 | 0.05 | 0.05 | 0.05 | 0.05 | 0.05 | 0.05 | 0.05 | 0.05 | 0.05 | 0.05 |
|   | Polyvinyl Alcohol Resin | PVA-235 Aqueous Solution | 6 | 6 | 6 | 6 | 6 | 6 | 6 | 6 | 6 | 6 | 6 |
|   |   | KL-506 Aqueous Solution | 4 | 4 | 4 | 4 | 4 | 4 | 4 | 4 | 4 | 4 |   |
|   |   | KL-318 Aqueous Solution |   |   |   |   |   |   |   |   |   |   | 4 |
|   |   | PVA-217 Aqueous Solution |   |   |   |   |   |   |   |   |   |   |   |
|   |   | Gohsenol KL-05 Aqueous Solution |   |   |   |   |   |   |   |   |   |   |   |
|   |   | PVA-505 Aqueous Solution |   |   |   |   |   |   |   |   |   |   |   |
|   |   | KL-118 Aqueous Solution |   |   |   |   |   |   |   |   |   |   |   |
|   |   | PVA-205 Aqueous Solution |   |   |   |   |   |   |   |   |   |   |   |
|   |   | PVA-105 Aqueous Solution |   |   |   |   |   |   |   |   |   |   |   |
|   |   | PVA-117 Aqueous Solution |   |   |   |   |   |   |   |   |   |   |   |
| Evaluation | Slurry Composition | pH | 7 | 7 | 7 | 8 | 8 | 7 | 7 | 7 | 7 | 7 | 7 |
|   |   | Pyrolysis Behavior | A | A | A | A | A | A | A | A | A | A | A |
|   |   | Slurry Stability | A | A | A | A | A | A | A | A | A | A | A |
|   | Sheet Characteristics | Smoothness | A | A | A | A | A | A | A | A | A | A | A |
|   |   | Strength | A | A | A | A | A | A | A | A | A | A | A |
|   |   | Flexibility | A | A | A | A | A | A | A | A | A | A | B |
|   |   | Adhesiveness | A | A | A | A | A | A | A | A | A | A | A |
|   |   | Water Resistance | A | A | A | B | B | A | A | A | A | A | A |

TABLE 2

|   |   |   | Example |   |   |   |   |   |   |   |   |   |   |
|---|---|---|---|---|---|---|---|---|---|---|---|---|---|
|   |   |   | 12 | 13 | 14 | 15 | 16 | 17 | 18 | 19 | 20 | 21 | 22 |
| A | Inorganic Powder | Ferric Oxide | 20 | 20 | 20 | 20 | 20 | 20 | 20 | 20 | 20 | 20 | 20 |
|   | Solvent | Water | 4 | 4 | 4 | 4 | 4 | 4 | 4 | 4 | 4 | 4 | 4 |
|   | Dispersant | Polyacrylic Acid Ammonium Salt Aqueous Solution | 0.2 | 0.2 | 0.2 | 0.2 | 0.2 | 0.2 | 0.2 | 0.2 | 0.2 | 0.2 | 0.2 |
|   | Amino Alcohol Compound | AMIET 105 | 0.3 | 0.3 | 0.3 | 0.3 | 0.3 | 0.3 | 0.8 | 0.2 |   | 0.5 |   |
|   |   | AMIET 302 |   |   |   |   |   |   |   |   | 0.6 |   | 0.3 |
|   |   | AMIET 320 |   |   |   |   |   |   |   |   |   |   |   |
|   |   | Diethanolamine |   |   |   |   |   |   |   |   |   |   |   |
|   |   | Nymeen L-207 |   |   |   |   |   |   |   |   |   |   |   |
|   |   | Nymeen L-201 |   |   |   |   |   |   |   |   |   |   |   |
|   |   | Nymeen S-210 |   |   |   |   |   |   |   |   |   |   |   |
|   |   | Blaunon L-230 |   |   |   |   |   |   |   |   |   |   |   |
|   |   | Blaunon S-230 |   |   |   |   |   |   |   |   |   |   |   |
| B | Defoamant | SN Defoamer 470 | 0.05 | 0.05 | 0.05 | 0.05 | 0.05 | 0.05 | 0.05 | 0.05 | 0.05 | 0.05 | 0.05 |
|   |   | SN Defoamer 485 | 0.05 | 0.05 | 0.05 | 0.05 | 0.05 | 0.05 | 0.05 | 0.05 | 0.05 | 0.05 | 0.05 |
|   | Polyvinyl Alcohol Resin | PVA-235 Aqueous Solution | 6 | 6 | 3 | 6 | 6 | 6 | 7 | 2 | 6 | 6 | 5 |
|   |   | KL-506 Aqueous Solution | 2 |   | 4 |   |   |   | 3 | 6 | 4 |   |   |
|   |   | KL-318 Aqueous Solution | 2 | 2 |   |   |   |   |   |   |   | 2 |   |
|   |   | PVA-217 Aqueous Solution |   |   | 3 |   |   |   |   |   |   |   |   |
|   |   | Gohsenol KL-05 Aqueous Solution |   |   |   | 4 |   |   |   |   |   |   |   |
|   |   | PVA-505 Aqueous Solution |   | 2 |   |   | 4 |   |   |   |   |   | 5 |
|   |   | KL-118 Aqueous Solution |   |   |   |   |   | 4 |   |   |   | 2 |   |
|   |   | PVA-205 Aqueous Solution |   |   |   |   |   |   |   |   |   |   |   |
|   |   | PVA 105 Aqueous Solution |   |   |   |   |   |   |   |   |   |   |   |
|   |   | PVA-117 Aqueous Solution |   |   |   |   |   |   |   |   |   |   |   |
| Evaluation | Slurry Characteristics | pH | 7 | 7 | 7 | 7 | 7 | 7 | 7 | 6 | 7 | 7 | 7 |
|   |   | Pyrolysis Behavior | A | A | A | A | A | A | A | A | A | A | A |
|   |   | Slurry Stability | A | A | A | A | A | A | A | A | A | A | A |
|   | Sheet Characteristics | Smoothness | A | A | A | A | A | A | A | A | A | A | A |
|   |   | Strength | A | A | A | B | B | A | A | A | A | A | B |
|   |   | Flexibility | A | A | A | A | A | B | A | A | A | B | A |
|   |   | Adhesiveness | A | A | A | A | A | A | A | A | A | A | A |
|   |   | Water Resistance | A | A | A | A | A | A | A | A | A | A | A |

TABLE 3

|   |   |   | \multicolumn{12}{c}{Example} |
| --- | --- | --- | --- | --- | --- | --- | --- | --- | --- | --- | --- | --- | --- | --- |
|   |   |   | 23 | 24 | 25 | 26 | 27 | 28 | 29 | 30 | 31 | 32 | 33 | 34 |
| A | Inorganic Powder | Ferric Oxide | 20 | 20 | 20 | 20 | 20 | 20 | 20 | 20 | 20 | 20 | 20 | 20 |
|   | Solvent | Water | 4 | 4 | 4 | 4 | 4 | 4 | 4 | 4 | 4 | 4 | 4 | 4 |
|   | Dispersant | Polyacrylic Acid Ammonium Salt Aqueous Solution | 0.2 | 0.2 | 0.2 | 0.2 | 0.2 | 0.2 | 0.2 | 0.2 | 0.2 | 0.2 | 0.2 | 0.2 |
|   | Amino Alcohol Compound | AMIET 105 |   |   |   |   |   |   |   |   |   |   |   |   |
|   |   | AMIET 302 | 0.3 | 0.3 | 0.3 | 1 |   | 1.5 |   | 0.3 | 0.3 | 0.3 | 0.3 | 0.3 |
|   |   | AMIET 320 |   |   |   |   | 1 |   | 1.5 |   |   |   |   |   |
|   |   | Diethanolamine |   |   |   |   |   |   |   |   |   |   |   |   |
|   |   | Nymeen L-207 |   |   |   |   |   |   |   |   |   |   |   |   |
|   |   | Nymeen L-201 |   |   |   |   |   |   |   |   |   |   |   |   |
|   |   | Nymeen S-210 |   |   |   |   |   |   |   |   |   |   |   |   |
|   |   | Blaunon L-230 |   |   |   |   |   |   |   |   |   |   |   |   |
|   |   | Blaunon S-230 |   |   |   |   |   |   |   |   |   |   |   |   |
| B | Defoamant | SN Defoamer 470 | 0.05 | 0.05 | 0.05 | 0.05 | 0.05 | 0.05 | 0.05 | 0.05 | 0.05 | 0.05 | 0.05 | 0.05 |
|   |   | SN Defoamer 485 | 0.05 | 0.05 | 0.05 | 0.05 | 0.05 | 0.05 | 0.05 | 0.05 | 0.05 | 0.05 | 0.05 | 0.05 |
|   | Polyvinyl Alcohol Resin | PVA-235 Aqueous Solution | 13 |   |   | 6 | 6 | 6 | 6 |   |   |   |   |   |
|   |   | KL-506 Aqueous Solution |   | 7 |   | 4 | 4 | 4 | 4 |   |   |   |   |   |
|   |   | KL-318 Aqueous Solution |   |   | 7 |   |   |   |   |   |   |   |   |   |
|   |   | PVA-217 Aqueous Solution |   |   |   |   |   |   |   |   |   |   |   |   |
|   |   | Gohsenol KL-05 Aqueous Solution |   |   |   |   |   |   |   |   |   |   |   |   |
|   |   | PVA-505 Aqueous Solution |   |   |   |   |   |   |   |   |   |   |   |   |
|   |   | KL-118 Aqueous Solution |   |   |   |   |   |   |   |   |   |   |   |   |
|   |   | PVA-205 Aqueous Solution |   |   |   |   |   |   |   | 7 |   |   |   |   |
|   |   | PVA-105 Aqueous Solution |   |   |   |   |   |   |   |   | 7 |   |   |   |
|   |   | PVA-117 Aqueous Solution |   |   |   |   |   |   |   |   |   | 7 |   |   |
|   |   | JMR-500P Aqueous Solution |   |   |   |   |   |   |   |   |   |   | 21 |   |
|   |   | JMR-800HH Aqueous Solution |   |   |   |   |   |   |   |   |   |   |   | 26 |
| Evaluation | Slurry Characteristics | pH | 7 | 7 | 7 | 8 | 8 | 9 | 9 | 7 | 7 | 7 | 7 | 7 |
|   |   | Pyrolysis Behavior | A | A | B | A | B | A | B | A | A | A | B | B |
|   |   | Slurry Stability | A | A | B | B | B | B | B | A | A | A | A | A |
|   | Sheet Characteristics | Smoothness | B | B | B | B | B | B | B | B | B | B | B | B |
|   |   | Strength | B | B | A | B | B | B | B | B | A | A | A | A |
|   |   | Flexibility | B | A | B | A | A | A | A | B | B | B | B | B |
|   |   | Adhesiveness | B | A | B | A | A | A | A | B | B | B | B | B |
|   |   | Water Resistance | A | A | A | A | A | A. | A | A | A | A | A | A |

TABLE 4

|   |   |   | \multicolumn{10}{c}{Comparative Example} |
| --- | --- | --- | --- | --- | --- | --- | --- | --- | --- | --- | --- | --- |
|   |   |   | 1 | 2 | 3 | 4 | 5 | 6 | 7 | 8 | 9 | 10 |
| A | Inorganic Powder | Ferric Oxide | 20 | 20 | 20 | 20 | 20 | 20 | 20 | 20 | 20 | 20 |
|   | Solvent | Water | 4 | 4 | 4 | 4 | 4 | 4 | 4 | 4 | 4 | 4 |
|   | Dispersant | Polyacrylic Acid Ammonium Salt Aqueous Solution | 0.2 | 0.2 | 0.2 | 0.2 | 0.2 | 0.2 | 0.2 | 0.2 | 0.2 | 0.2 |
|   | Amino Alcohol Compound | AMIET 105 | 0.3 |   |   |   |   |   |   |   |   |   |
|   |   | AMIET 302 |   |   |   |   |   |   |   |   |   |   |
|   |   | AMIET 320 |   |   |   |   |   |   |   |   |   |   |
|   |   | Ethylene Glycol |   | 0.3 |   |   |   | 1 |   |   |   |   |
|   |   | HI-MOL PM |   |   | 0.3 |   |   |   | 1 |   |   |   |
|   |   | DOA |   |   |   | 0.3 |   |   |   |   |   |   |
|   |   | Epocizer W-131 |   |   |   |   | 0.3 |   |   |   |   |   |
|   |   | PEG-600 |   |   |   |   |   |   |   | 0.3 |   |   |
|   |   | AMP-100 |   |   |   |   |   |   |   |   | 0.3 |   |
|   |   | Glycerin |   |   |   |   |   |   |   |   |   | 0.3 |
| B | Defoamant | SN Defoamer 470 | 0.05 | 0.05 | 0.05 | 0.05 | 0.05 | 0.05 | 0.05 | 0.05 | 0.05 | 0.05 |
|   |   | SN Defoamer 485 | 0.05 | 0.05 | 0.05 | 0.05 | 0.05 | 0.05 | 0.05 | 0.05 | 0.05 | 0.05 |
|   | Polyvinyl Alcohol Resin | PVA-235 Aqueous Solution |   | 14 | 14 | 14 | 14 | 14 | 14 | 14 | 14 | 14 |
|   |   | KL-506 Aqueous Solution |   |   |   |   |   |   |   |   |   |   |
|   |   | KL-318 Aqueous Solution |   |   |   |   |   |   |   |   |   |   |
|   |   | PVA-217 Aqueous Solution |   |   |   |   |   |   |   |   |   |   |
|   |   | Gohsenol KL-05 Aqueous Solution |   |   |   |   |   |   |   |   |   |   |
|   |   | PVA 505 Aqueous Solution |   |   |   |   |   |   |   |   |   |   |
|   |   | KL-118 Aqueous Solution |   |   |   |   |   |   |   |   |   |   |
|   |   | PVA-205 Aqueous Solution |   |   |   |   |   |   |   |   |   |   |
|   |   | PVA-105 Aqueous Solution |   |   |   |   |   |   |   |   |   |   |
|   |   | PVA-117 Aqueous Solution |   |   |   |   |   |   |   |   |   |   |
|   |   | HPC-SSL Aqueous Solution | 10 |   |   |   |   |   |   |   |   |   |

TABLE 4-continued

| | | | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| Evaluation | Slurry Characteristics | pH | 7 | 7 | 7 | 7 | 7 | 7 | 7 | 7 | 7 | 7 |
| | | Pyrolysis Behavior | C | A | A | A | A | A | A | A | A | A |
| | | Slurry Stability | B | A | A | A | A | A | A | A | A | A |
| | Sheet Characteristics | Smoothness | C | B | B | B | B | B | B | B | B | B |
| | | Strength | C | A | A | A | A | B | B | B | B | B |
| | | Flexibility | C | C | C | C | C | B | B | C | C | C |
| | | Adhesiveness | C | C | C | C | C | B | B | C | C | C |
| | | Water Resistance | D | C | C | C | C | D | D | D | C | D |

SUMMARY

As can be seen from the description above, a baking slurry composition of a first aspect according to the present invention contains an amino alcohol compound (A) represented by formula (1), inorganic powder (B), a polyvinyl alcohol resin (C), and water. In the formula (1), R is a hydrogen atom or an alkyl group having a carbon number larger than or equal to 1 and smaller than or equal to 20, and m and n are values satisfying conditions $m \geq 0$, $n \geq 0$, and $m+n \geq 1$.

The first aspect provides the advantage that baking slurry composition is obtained, wherein in the case of forming the baking slurry composition into a sheet, the sheet can have increased flexibility while increased strength of the sheet is maintained.

In a baking slurry composition of a second aspect referring to the first aspect, the polyvinyl alcohol resin (C) contains a component (C3) having a saponification degree of more than or equal to 85 mol % and less than or equal to 99 mol %, and a component (C4) having a saponification degree of more than or equal to 60 mol % and less than 85 mol %.

According to the second aspect, the component (C3) has a higher percentage of hydroxyl groups than the component (C4). Therefore, the component (C3) can contribute to the improvement of the strength of the sheet produced from the baking slurry composition. On the other hand, the component (C4) can contribute to an improvement in the flexibility of the sheet. Thus, it is possible to impart further increased strength and flexibility to the sheet formed from the baking slurry composition.

A baking slurry composition of a third aspect referring to the first or second aspect contains a nonionic polyvinyl alcohol resin (C1) and an anionic polyvinyl alcohol resin (C2).

According to the third aspect, it is possible to further improve the strength of the sheet to be produced from the baking slurry composition.

In a baking slurry composition of a fourth aspect referring to the third aspect, the anionic polyvinyl alcohol resin (C2) contains a polyvinyl alcohol resin (C21) having a carboxyl group.

According to the fourth aspect, the interaction between the carboxyl group of the anionic polyvinyl alcohol resin (C21) and the inorganic powder (B) becomes stronger, and the strength of the sheet can thus be further improved. In addition, in this case, it is easier to adjust the balance between the physical property and the pH of the baking slurry composition. Therefore, it is possible to reduce the occurrence of aggregation and gelation in the case of paste being produced from the baking slurry composition, which enables physical property of the sheet to be further improved.

In a baking slurry composition of an fifth aspect referring to the fourth aspect, the nonionic polyvinyl alcohol resin (C1) contains a nonionic polyvinyl alcohol resin (C11) having a saponification degree of more than or equal to 85 mol % and less than or equal to 99 mol %, and a nonionic polyvinyl alcohol resin (C12) having a saponification degree of more than or equal to 60 mol % and less than 85 mol %.

According to the fifth aspect, the polyvinyl alcohol resin (C11) has a higher percentage of hydroxyl groups than the polyvinyl alcohol resin (C12) and can therefore contribute to the improvement of the strength of the sheet produced from the baking slurry composition. In addition, since the polyvinyl alcohol resin (C21) has a carboxyl group, the contribution of the polyvinyl alcohol resin (C21) to the improvement of the strength of the sheet is even greater. On the other hand, the polyvinyl alcohol resin (C12) can contribute to the improvement of the flexibility of the sheet. Thus, it is possible to impart further increased strength and flexibility to the sheet to be produced from the baking slurry composition.

In a baking slurry composition of a sixth aspect referring to the fifth aspect, the nonionic polyvinyl alcohol resin (C1) contains the nonionic polyvinyl alcohol resin (C11) having a saponification degree of more than or equal to 85 mol % and less than or equal to 99 mol %, and the nonionic polyvinyl alcohol resin (C21) contains an anionic polyvinyl alcohol resin (C211) having a saponification degree of more than or equal to 60 mol % and less than 85 mol % and a carboxyl group.

According to the sixth aspect, the polyvinyl alcohol resin (C11) has a higher percentage of hydroxyl groups than the polyvinyl alcohol resin (C21) and can therefore contribute to the improvement of the strength of the sheet to be produced from the baking slurry composition. Although the ratio of the hydroxyl group in the polyvinyl alcohol resin (C211) is smaller than that in the polyvinyl alcohol resin (C12), the polyvinyl alcohol resin (C211) has a carboxyl group, and therefore, the polyvinyl alcohol resin (C211) can contribute to the improvement of the strength while the increased flexibility of the sheet is maintained. Thus, it is possible to impart further increased strength and flexibility to the sheet to be produced from the baking slurry composition.

In a baking slurry composition of a seventh aspect referring to any one of the first to sixth aspects, the amino alcohol compound (A) contains an amino alcohol compound (A1) represented by formula (2). In the formula (2), R is alkyl group having a carbon number larger than or equal to 10 and smaller than or equal to 20, and m and n are values satisfying conditions $m \geq 0$, $n \geq 0$, and $m+n \geq 1$.

According to the seventh aspect, the amino alcohol compound (A1) includes a hydrophilic hydroxyl group and a lipophilic alkyl group. Thus, it is possible to impart increased flexibility and strength in a balanced manner to a sheet formed from the baking slurry composition. Moreover, in the case of baking the sheet formed from the baking slurry composition, it is possible to suppress breakage of the sheet due to evaporation or the like of moisture in the sheet.

A green sheet of an eighth aspect contains an amino alcohol compound (A) represented by formula (1), inorganic powder (B), and a polyvinyl alcohol resin (C). In the formula (1), R is a hydrogen atom or an alkyl group having a carbon number larger than or equal to 1 and smaller than or equal to 20, and m and n are values satisfying conditions $m \geq 0$, $n \geq 0$, and $m+n \geq 1$.

According to the eighth aspect, the green sheet can have increased strength and flexibility. Therefore, it is possible to make it difficult for the sheet to be warped. This enables the adhesiveness of the sheet to a base material such as carrier film to be improved. Therefore, it is also possible to reduce the formation of cracks in the green sheet.

The green sheet of a ninth aspect referring to the tenth aspect is a green sheet adopted to produce a ceramic capacitor containing a sintered product of the inorganic powder (B), the sintered product being obtained by baking the green sheet.

According to the ninth aspect, the sheet is suitably utilizable as a ceramic green sheet for producing a monolithic ceramic capacitor or the like.

A method for manufacturing a green sheet of a tenth aspect includes applying and drying the baking slurry composition containing an amino alcohol compound (A) represented by formula (1), inorganic powder (B), a polyvinyl alcohol resin (C), and water. In the formula (1), R is a hydrogen atom or an alkyl group having a carbon number larger than or equal to 1 and smaller than or equal to 20, and m and n are values satisfying conditions $m \geq 0$, $n \geq 0$, and $m+n \geq 1$.

According to the tenth aspect, it is possible to provide a green sheet having increased flexibility while the increased strength of the green sheet is maintained.

A method for manufacturing a sintered product of an eleventh aspect includes baking the green sheet of the eighth or ninth aspect or the green sheet obtained by the method of the tenth aspect.

According to the eleventh aspect, the green sheet has increased strength and flexibility, and therefore, also when a plurality of the green sheets are stacked to produce a monolithic ceramic capacitor, reducing the thickness of the monolithic ceramic capacitor is easily possible.

A method for manufacturing a monolithic ceramic capacitor of a twelfth aspect includes baking a stack obtained by stacking a plurality of the green sheets of the eighth or ninth aspect on each other or obtained by stacking a plurality of the green sheets obtainable by the method for manufacturing the green sheet of the eleventh aspect on each other.

According to the twelfth aspect, even in the case of a stack including a plurality of sheets stacked on each other, reducing the thickness of the monolithic ceramic capacitor is easily possible.

The invention claimed is:
1. A baking slurry composition, comprising:
an amino alcohol compound (A) represented by formula (1);
inorganic powder (B);
a polyvinyl alcohol resin (C); and
water,

[Chemical 1]

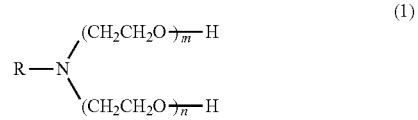

in the formula (1), R being a hydrogen atom or an alkyl group having a carbon number larger than or equal to 1 and smaller than or equal to 20, and m and n being values satisfying conditions $m \geq 0$, $n \geq 0$, and $m+n \geq 1$,
an amount of the amino alcohol compound (A) to 100 parts by mass of the polyvinyl alcohol resin (C) being greater than or equal to 2 parts by mass and less than or equal to 75 parts by mass.

2. The baking slurry composition of claim 1, wherein the polyvinyl alcohol resin (C) contains
a component (C3) having a saponification degree of more than or equal to 85 mol % and less than or equal to 99 mol %, and
a component (C4) having a saponification degree of more than or equal to 60 mol % and less than 85 mol %.

3. The baking slurry composition of claim 1, wherein the polyvinyl alcohol resin (C) contains a nonionic polyvinyl alcohol resin (C1) and an anionic polyvinyl alcohol resin (C2).

4. The baking slurry composition of claim 3, wherein the anionic polyvinyl alcohol resin (C2) contains a polyvinyl alcohol resin (C21) having a carboxyl group.

5. The baking slurry composition of claim 4, wherein the nonionic polyvinyl alcohol resin (C1) contains
a nonionic polyvinyl alcohol resin (C11) having a saponification degree of more than or equal to 85 mol % and less than or equal to 99 mol %, and
a nonionic polyvinyl alcohol resin (C12) having a saponification degree of more than or equal to 60 mol % and less than 85 mol %.

6. The baking slurry composition of claim 5, wherein the nonionic polyvinyl alcohol resin (C1) contains a nonionic polyvinyl alcohol resin (C11) having a saponification degree of more than or equal to 85 mol % and less than or equal to 99 mol %, and
the polyvinyl alcohol resin (C21) contains an anionic polyvinyl alcohol resin (C211) having a saponification degree of more than or equal to 60 mol % and less than 85 mol % and a carboxyl group.

7. The baking slurry composition of claim 1, wherein the amino alcohol compound (A) contains an amino alcohol compound (A1) represented by formula (2),

[Chemical 2]

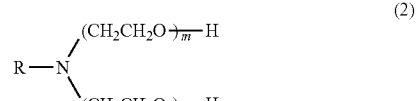

and
in the formula (2), R is an alkyl group having a carbon number larger than or equal to 10 and smaller than or equal to 20, and m and n being values satisfying conditions $m \geq 0$, $n \geq 0$, and $m+n \geq 1$.

8. A green sheet, comprising:
a dried product of the baking slurry composition of claim 1.

9. The green sheet of claim 8, wherein
the green sheet is adopted to produce a ceramic capacitor comprising a sintered product of the inorganic powder (B), the sintered product being obtained by baking the green sheet.

10. A method for manufacturing a green sheet, the method comprising applying and drying a baking slurry composition of claim 1.

11. A method for manufacturing a sintered product, the method comprising baking the green sheet of claim 8.

12. A method for manufacturing a sintered product, the method comprising baking the green sheet obtainable by the method of claim 10.

13. A method for manufacturing a monolithic ceramic capacitor, the method comprising baking a stack obtained by stacking a plurality of the green sheets of claim 8 on each other.

14. A method for manufacturing a monolithic ceramic capacitor, the method comprising baking a stack obtained by stacking a plurality of green sheets obtainable by the method of claim 10 on each other.

* * * * *